United States Patent [19]

Roselli

[11] Patent Number: 5,086,641
[45] Date of Patent: Feb. 11, 1992

[54] ARRANGEMENT FOR DYNAMIC CALIBRATING AN ABSOLUTE POSITION ENCODER

[75] Inventor: Leonard Roselli, Verona, Pa.

[73] Assignee: Westinghouse Air Brake Company, Wilmerding, Pa.

[21] Appl. No.: 516,603

[22] Filed: Apr. 30, 1990

[51] Int. Cl.$^5$ ............................................. G01D 18/00
[52] U.S. Cl. .............................. 73/1 D; 250/231.18; 364/426.05; 364/571.04
[58] Field of Search .................... 73/1 D, 118.1; 364/426.14–426.05, 571.01–571.08; 250/231.18; 303/20; 246/189

[56] References Cited

U.S. PATENT DOCUMENTS

| 4,382,250 | 5/1983 | Radaelli | 73/118.1 X |
| 4,470,124 | 9/1984 | Togami et al. | 73/1 D X |
| 4,524,347 | 6/1985 | Rogers | 250/231.18 X |
| 4,604,725 | 8/1986 | Davies et al. | 250/231.18 X |
| 4,654,522 | 3/1987 | Gurnick et al. | 250/231.18 |
| 5,036,468 | 7/1991 | Roselli | 303/20 X |

FOREIGN PATENT DOCUMENTS 1422059 9/1988 U.S.S.R. ............................. 73/118.1

Primary Examiner—Tom Noland
Attorney, Agent, or Firm—J. B. Sotak

[57] ABSTRACT

A dynamic calibration arrangement comprising, a brake handle for controlling the braking of a railway vehicle, an absolute position encoder for monitoring the position of the brake handle, an electrical switch for ascertaining when the brake handle is in a release position, and a logic gate for activating an enable circuit for reading the absolute position encoder, and a storage register for storing and for employing the reading as an offset value for correcting subsequent readings of other positions of the brake handle.

20 Claims, 2 Drawing Sheets

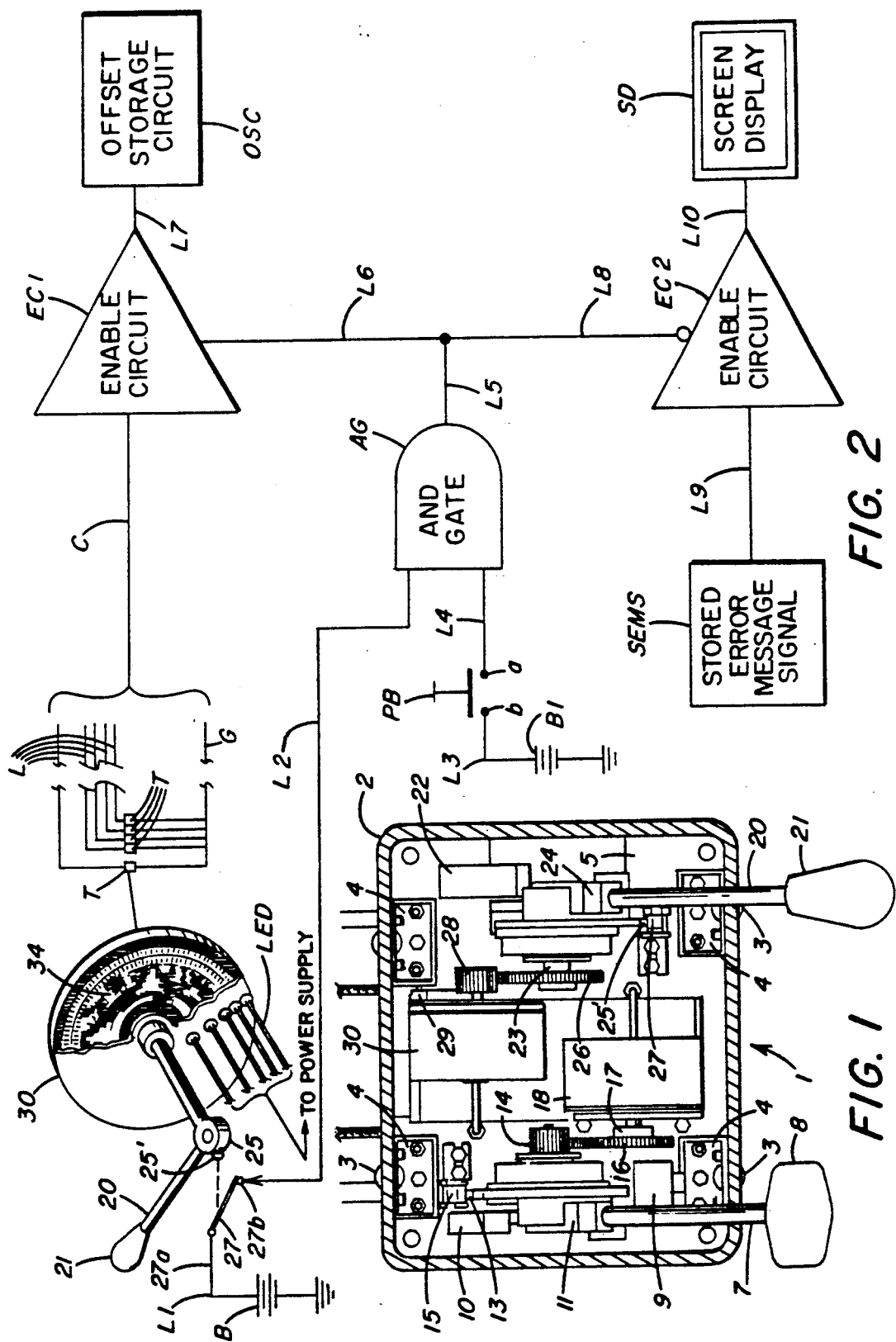

ARRANGEMENT FOR DYNAMIC CALIBRATING AN ABSOLUTE POSITION ENCODER

FIELD OF THE INVENTION

This invention relates to a method of calibrating a digital absolute position encoder and, more particularly, to an arrangement for establishing an initial offset reading of an absolute position encoder by ascertaining that the brake handle of a cab control unit is in a release or non-braking position and for storing the offset reading in permanent memory for subsequent use to effectively control the air brake operation on a railway vehicle.

BACKGROUND OF THE INVENTION

In railroad and mass and/or rapid transit operation, the braking action is controlled by the operator or trainman in the cab of the lead vehicle and locomotive of a train. In the past, the cab included a brake valve having either a 30 type of desk-style console or a traditional 26 style control stand with each style employing two brake handles for controlling of the braking of the train.

The automatic or train control is accomplished by rotation of a first brake handle through approximately the same angle of rotation on either the 26 or 30 style brake valve. The rotational movement of the automatic brake handle from a release or running position to a minimum service brake position creates a step function resulting in a pressure change in the brake pipe consistent with a minimum brake pipe reduction. Further rotation of the automatic brake handle through the braking range provides a complete variable control of the brake pipe up to the full service brake position. If rotation of the handle is continued through the full service position, it will move to a suppression position, to an over-reduction zone, and finally to an emergency position. A positive mechanical detent is provided for each position to assist the engineman by providing him with a sense of feel for the distinct braking positions.

The control of the locomotive or independent brake is accomplished by rotational movement of a second brake handle. The rotation of the independent brake handle provides a complete variable control from a release position to a full independent application position.

In practice, the cab control unit is arranged and designed to be a man-to-machine interface and is strictly an electrical/electronic device which has no pneumatic connections. An associated microcomputer contains the intelligence to issue and interpret brake commands initiated from the cab control unit to the pneumatic control unit. As noted above, the brake commands emanating from the cab control unit are dependent upon the given positions of the automatic and/or independent brake handles. In practice, the angular positions of the brake handles are monitored and sensed by rotary absolute encoders which are mechanically coupled to associated rotary shafts. In order to accurately detect the discrete angular brake positions, it is necessary to establish a zero or home position for both of the brake handles. In the past, the zero position was mechanically established during the assembly of the equipment. This type of mechanical initialization or set-up of an encoder is both expensive and time-consuming. In addition, a railroad environment is susceptible to a wide variation of temperatures and is exposed to extreme vibrations and agitations which can adversely affect the initial zero position setting.

OBJECTS AND SUMMARY OF THE INVENTION

Accordingly, it is an object of this invention to provide a unique arrangement for calibrating a zero angular position for an absolute optical encoder.

Another object of this invention is to provide means for dynamic calibration of an absolute position encoder by reading and storing zero position data during a calibration procedure.

A further object of this invention is to provide an arrangement for sampling and storing zero position information of an absolute position encoder for subsequent usage in a brake control system of a railway vehicle.

Still another object of this invention is to provide a novel zero position detector for ascertaining when a rotary brake handle is in a release position to establish an encoder offset value which is saved and stored in memory for future use.

Still a further object of this invention is to provide an arrangement in which a dynamic calibration procedure of an absolute position encoder can be performed at any time following its installation.

Yet another object of this invention is to provide an absolute position encoder calibration which can be checked dynamically at any given time so that a warning message can be exhibited on a display screen when a calibration error exists.

Still a further object of this invention is to provide a method for dynamic calibration of an absolute position encoder by reading the encoder when it is positioned in a certain fixed orientation which is confirmed by the detection of the closure of a switch to cause the storage of an offset value to modify further encoder readings.

An additional object of this invention is to provide a calibration arrangement comprising, handle means for controlling the braking on a railway vehicle, an encoder means for monitoring the position of the handle means, means for ascertaining when the handle means is in a release position, and means for activating an enable means for reading the encoder means and for storing and employing the reading as an offset value for subsequent readings of other positions of the handle means.

Still an additional object of this invention is to provide an arrangement for calibrating an absolute position encoder when a brake handle is in a release position comprising, first means for establishing that the brake handle is in the release position, second means for conditioning a third means, third means enabling a fourth means, fourth means for causing a read-out of the encoder for obtaining an offset value, and fifth means for storing the offset value.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1 is a top plan view of a console type of a cab control unit, with the cover removed, for locomotive brake apparatus which may be used in carrying out the present invention.

FIG. 2 is a view partially in isometric and partially in block form, of the cab control unit of the electrical and electronic components of the dynamic absolute encoder calibration system embodying the present invention.

DETAILED DESCRIPTION OF THE INVENTION

Figure 3:
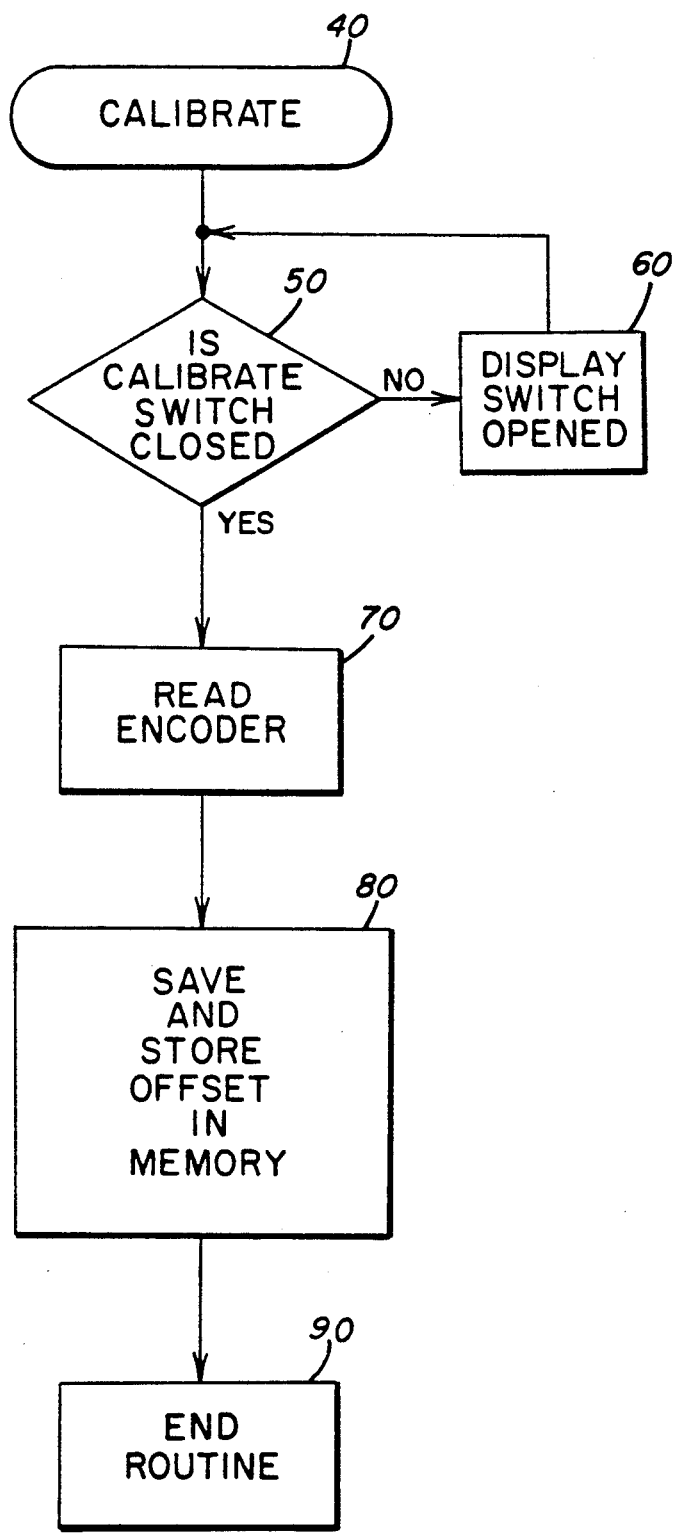
FIG. 3 is a flow chart illustrating the functions carried out by the circuitry of FIG. 2.

Referring now to the drawings, and in particular to FIG. 1, there is shown a desk-top-style cab control unit, generally characterized by numeral 1, which is designed to precisely fit into the opening of the previous brake valve and is mounted on the console in an identical manner as its predecessor. For convenience purposes, the top portion of the console cover 2 has been cut away to more clearly illustrate the internal components or parts of the cab control unit. As shown in FIG. 1, the cover member 2 is attached by four (4) oval-slotted fasteners 3 to four (4) respective side mounts 4 which are screw-fastened to the top of a base support plate 5. The cab control unit 1 includes a first automatic brake handle or member 7 which is rotatable in a counterclockwise direction as viewed from the left in FIG. 1, from a bottom release position as shown, through intermediate minimum service braking range, full service, and suppression positions to an upper emergency position. That is, the operator or engineman simply grasps the knob 8 and moves the handle 7 off the release stop block 9 and then may rotate the handle 7 through the intermediate positions until the emergency stop block 10 is reached and engaged. The angular rotation of handle 7 is conveyed by a yoke member 11 to a bearing supported shaft 12 which carries a cam disc 13 and spur gear 14. The cam portion 13' of the disk 13 is adapted to engage and depress an actuator or operating member to close electrical contacts of a snap-acting switch 15 only when the handle 7 is in its release position, as shown in FIGS. 1 and 2. It will be seen that the teeth of the spur gear 14 are arranged to engage the teeth of a spur gear 16 which is carried by the end of a shaft 17 of a rotary absolute position encoder 18. It will be understood that the encoder 18 may be an EP series CMOS logic device which is manufactured and sold by Compumotor Division of Parker Hannifin Corporation.

In viewing FIG. 1, it will be seen that the cab control unit 1 also includes a second independent brake handle 20 and knob 21. The handle 20 is rotatable in a clockwise direction as viewed from the right in FIG. 1, from a bottom release position as shown through a full range of application positions to an uppermost full application position. If the operator desires to move the independent handle 20 from stop block 22, he simply grabs the knob 21 and rotates it to the desired application position. The rotation of the handle 20 is transferred to a bearing supported shaft by a yoke member 24 which cooperates with the stop member 22 to limit the rotational movement between the release and full application positions. The rotary shaft 23 carries a cam disc 25 and a spur gear 26. The cam portion 25' arranged to operate an actuator or pivotal arm to close the contacts of a snap-acting electrical switch 27 only when the independent handle 20 is in its release position, as shown in FIG. 1. It will be seen that the teeth of the spur gear 26 are arranged to mesh with the teeth of the spur gear 28 which is fixedly attached to the end of the shaft 29 of an absolute position encoder 30. Like the automatic handle position encoder 18, the independent handle position encoder 30 may be an EP series absolute position encoder which is a product of Compumotor Division of Parker Hannifin Corporation. The rotary absolute encoder utilizes an EPLD chip which is a CMOS logic device. The CMOS chip encoder offers a quick update of the encoder position, has lower input power requirements, and provides a compact decoder electronics size for direct integration into the housing of the encoder. Each of the encoders provides a 10-bit parallel binary output data to represent the discrete position information which is the orientation of the brake handles 7 and 20. The 10-bit output provides a binary range of 0-1024 for a single-turn version.

Referring now to FIG. 2, let us assume that the following description and analysis is related to the operation of the independent brake handle 20 and the related components thereof. However, while the present description and operation of FIG. 2 will be referred to as the manipulation of the independent brake handle 20, it is understood that the same would be true with respect to the automatic brake handle structure and function.

It will be seen that the binary output data of encoder 30 is the product of suitable light sources, such as light-emitting diodes which directs light onto a coded disk 34 which activates or deactivates a plurality of photoresponsive devices. In the present instance, the rotatable disk 34 is constructed of metal and has ten concentric etched tracks formed thereon. Each track is arranged to cooperate with one of an array of light-emitting diodes LED and an associated phototransistor T parallel to the disk 34. As shown, the LED's are connected to a suitable power supply. It will be noted that, as an opening in the disk passes an LED, the light will activate the corresponding light responsive transistor T. The presence of a slot will cause a high or logical "1" output while the absence of a slot will cause a low or logical "0" output. Each state will be assigned a number by the decoding electronics which, when combined, will correspond to a binary number. With ten (10) bits, the resolution is 1024 discrete positions.

It will be appreciated that the cable C carrying the ten (10) leads L and ground G is connected to the input of an electronic enable circuit EC1. As previously mentioned, it is necessary to initially determine a reference level or zero position for the encoder 30. In the present case, this is accomplished by ascertaining if and when the independent handle 20 is in its release position. As shown in FIG. 2, the cam portion 25' of the disk 25 will cause the contacts 27a and 27b of the electrical calibration switch 27 to close when and only when the independent handle 20 is in a release position. In any other position, the contacts 27a and 27b of the snap-acting switch 27 are opened. It will be seen that when the calibration switch 27 is closed, signifying that the handle 20 is in a release position, a circuit path is established from voltage source, such as battery B, through lead L1, over closed contacts 27a and 27b, through lead L2 to one input of a two-input AND gate logic circuit AG. As will be noted, the other input of AND gate AG is connected to terminal a of a normally open push-button switch PB of a keyboard via lead L3. It will be seen that the other terminal b of switch PB is connected to a suitable voltage source, such as battery B1 via lead L4. In practice, the push-button switch PB is an ENTER command key on a keyboard which is mounted on the top cover 2 of cab control unit 1.

Let us now assume that the handle 20 is in its release position so that a high or logical "1" appears on the one input of the AND gate AG and that at the same time the operator or trainman wishes to calibrate the absolute position encoder 30. The operator simply depresses the push-button ENTER keyboard switch PB which closes contacts a and b. This causes the battery B1 to be connected to the other input of the AND gate AG via leads L3 and L4. The positive voltage of battery B1 causes a high or logical "1" to appear on the other input of AND gate AG. The two high inputs cause the gate to produce a high or logical "1" output. The high output on lead L5 is conveyed by lead L6 to cause the high activated enable circuit EC1 to be enabled so that the 10-bit binary number appearing on cable C is conveyed by enable circuit EC1 to the offset storage or memory circuit OSC via lead L7. The 10-bit offset signal stored in the storage register OSC signifies the zero reference level of the encoder 30 which will be used to calculate the various application positions of the independent brake handle 20 as shown and described in my copending U.S. patent application Ser. No. 516,600, entitled "Arrangement For Reading An Absolute Position Encoder For Determining The Position Of A Brake Handle," filed concurrently herewith on Apr. 30, 1991 and now U.S. Pat. No. 5,036,468.

It will be seen that the high output developed on lead L5 is also conveyed to a low activated enable circuit EC2, however, the logical "1" is inverter to a logical "0" so that enable circuit EC2 remains disabled. The disabled enable circuit EC2 prevents the stored error message signal appearing on lead L9 to be conveyed to lead L10 so that the screen display SD remains blank or black.

Let us now assume that the operator wishes to calibrate the absolute position encoder 30 and that the independent handle 20 is not in the release position but is in one of the application positions. Under this condition, the contacts 27a and 27b of the calibration switch 27 are opened. Thus, the battery voltage is not available on lead L2 so that the one input of AND gate AG is at a low or logical "0" condition. Now the depression of the ENTER push-button switch PB has no effect on the AND gate AG so that a low or logical "0" output appears on lead L5. The logical "0" is unable to enable the enable circuit EC1 so no offset value is stored in the offset storage circuit OSC. However, the low or logical "0" on leads L5 and L8 is inverted to a logical "1" to enable the enable circuit EC2 so that the error message signal stored in circuit SEMS and appearing on lead L9 is passed by circuit EC2 to lead L10. The error signal causes an error message, such as, "calibration switch not closed," "independent handle not in release position," or the like, to be printed or exhibited on the screen display SD. to inform the operator that no calibration has occurred or will take place until he moves the brake handle 20 in its release position. Thus, it is not possible to erroneously calibrate the encoder 30 since the brake handle 20 must be in a release position.

It will be appreciated that the positive calibration of the absolute position encoder 18 is substantially the same, but requires that the automatic brake handle 7 must be placed in a release position to cause the storing of a 10-bit offset signal in memory for subsequent usage.

Turning now to the flow chart of FIG. 3, it will be seen that a sequence of operations is initiated by a start signal emanating from the Calibrate block 40. The start signal is fed to the decision block 50 which determines whether the calibrate switch 27 is closed. If the contacts 27a and 27b are not closed, calibration decision block outputs a "NO" signal. The "NO" signal is applied to the Display Switch Opened block 60 which causes the read-out screen to exhibit an appropriate error message to the engineman, namely, no calibration will take place since the switch 27 is open. The output of the Display block 60 is looped back to the block 50. If the calibration switch 27 is closed, the decision block 50 outputs a "YES" signal which is applied to the Read Encoder block 70 to cause the reading of the absolute position encoder 30. Thus, the block 60 reads the raw encoder value which will be used as an offset reference for subsequent encoder readings. The encoder offset reading of block 70 is applied to Save and Store Offset in Memory block 80. It will be applied that the offset encoder reading is saved in a non-volatile storage medium, such as, either a battery-back Random Access Memory (RAM) or Electrically Erasable Programmable Read Only Memory (EEPROM). The stored reading is retained in memory until another calibration is performed. The output of block 80 is applied to the End Routine block 90.

Thus, the present invention has been described in such full, clear, concise and exact terms as to enable any person skilled in the art to which it pertains to make and use the same, and having set forth the best mode contemplated of carrying out my invention. Further, I state that the subject matter which I regard as being my invention is particularly pointed and is distinctly set forth in what is claimed.

It will be understood that various alterations and changes may be made by those skilled in the art without departing from the spirit and scope of the subject invention. It will be appreciated that the EP series CMOS chip optical encoders 18 and 30 may be replaced by other types of suitable absolute position encoders, such as a VGE31-401-24 series contacting absolute position encoder; which is manufactured by Vernitech, a Division of Venitron Corporation. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

What I claim is:

1. A calibration arrangement comprising, handle means for controlling braking of a railway vehicle, encoder means for monitoring the position of said handle means, means for ascertaining when said handle means is in a release position, and means for activating an enable means for reading said encoder means and for storing and for employing said reading as an offset value for subsequent readings of other positions of said handle means.

2. The calibration arrangement as defined in claim 1, wherein said handle means is a rotatable member.

3. The calibration arrangement as defined in claim 1, wherein said encoder means is an absolute position device.

4. The calibration arrangement as defined in claim 1, wherein said ascertaining means takes the form of an electrical switch which is closed when said handle means is in the release position.

5. The calibration arrangement as defined in claim 1, wherein said activating means includes a push-button key switch which conditions an AND gate.

6. The calibration arrangement as defined in claim 1, wherein said enable means is deactivated by said ascertaining means when said handle means is out of the release position.

7. The calibration arrangement as defined in claim 1, wherein said storing means is a non-volatile storage medium.

8. The calibration arrangement as defined in claim 1, wherein said encoder means includes a plurality of light-emitting diodes and an equal number of phototransistors.

9. The calibration arrangement as defined in claim 8, wherein said encoder means includes a rotatable disk having a plurality of concentrically etched tracks.

10. The calibration arrangement as defined in claim 1, wherein a screen display informs an operator of the railway vehicle if the handle means is out of the release position.

11. An arrangement for calibrating an absolute position encoder when a brake handle is in a release position comprising, first means for establishing that the brake handle is in the release position, second means for conditioning a third means, said third means for enabling a fourth means, said fourth means for causing a read-out of the encoder for obtaining an offset value, and fifth means for storing the offset value.

12. The arrangement as defined in claim 11, wherein said first means takes the form of a electrical switch.

13. The arrangement as defined in claim 12, wherein said electrical switch comprises a stationary contact and cam-operated movable contact.

14. The arrangement as defined in claim 12, wherein said electrical switch is closed when the brake handle is in the release position.

15. The arrangement as defined in claim 11, wherein said second means is a push-button switch which is closed to condition said third means.

16. The arrangement as defined in claim 11, wherein said third means is a logic circuit.

17. The arrangement as defined in claim 16, wherein said logic circuit is an AND gate.

18. The arrangement as defined in claim 11, wherein said fifth means is a non-volatile storage medium.

19. The arrangement as defined in claim 11, said third means for conditioning a sixth means when the brake handle is out of the release position.

20. The arrangement as defined in claim 19, wherein said sixth means causes a seventh means to display a message that the brake handle is out of the release position.

* * * * *